United States Patent [19]

Almes

[11] Patent Number: 5,211,281

[45] Date of Patent: May 18, 1993

[54] MODULAR ROLLER CONVEYOR

[75] Inventor: Horst-Dieter Almes, Hildesheim, Fed. Rep. of Germany

[73] Assignee: Transnorm System GmbH, Harsum, Fed. Rep. of Germany

[21] Appl. No.: 854,283

[22] Filed: Mar. 20, 1992

[30] Foreign Application Priority Data

Mar. 22, 1991 [DE] Fed. Rep. of Germany ....... 4109367

[51] Int. Cl.$^5$ .............................................. B65G 13/06
[52] U.S. Cl. .................................... 198/781; 198/790
[58] Field of Search ................................ 198/781, 790

[56] References Cited

U.S. PATENT DOCUMENTS

| | | | |
|---|---|---|---|
| 3,716,129 | 2/1973 | Sadler, Jr. | 198/781 |
| 3,810,538 | 5/1974 | Moyes | 198/781 |
| 4,221,288 | 9/1980 | Rae | 198/781 |
| 4,264,004 | 4/1981 | Harwick | 198/781 |
| 4,301,914 | 11/1981 | Krammer | 198/790 X |
| 4,308,946 | 1/1982 | Ouellette | 198/790 |

*Primary Examiner*—Robert P. Olszewski
*Assistant Examiner*—Cheryl Gastineau
*Attorney, Agent, or Firm*—Peter K. Kontler

[57] ABSTRACT

A roller conveyor is assembled of several identical modules disposed end to end to define an elongated path for discrete commodities. Each module has a set of parallel idler rollers, an endless flexible belt with an upper reach in contact with the undersides of the rollers of the respective set, an electric motor which drives the belt, and a carrier and pad assembly which biases the upper reach of the belt against the adjacent rollers. The motors can be individually started and arrested in response to signals from photoelectronic detectors which are located above the downstream ends of successive modules and monitor the degree of occupancy of the respective modules.

18 Claims, 5 Drawing Sheets

MODULAR ROLLER CONVEYOR

BACKGROUND OF THE INVENTION

The invention relates to improvements in roller conveyors in general, and more particularly to improvements in roller conveyors which are designed to transport discrete commodities, e.g., from a maker to a processing machine or to storage. Still more particularly, the invention relates to improvements in roller conveyors adapted to be utilized for automatic transport of sensitive or highly sensitive commodities which are readily deformable, e.g., as a result of contact with neighboring commodities.

It is already known to assemble a roller conveyor from a desired number of cylindrical idler rollers which extend transversely of the direction of intended transport of commodities and can be engaged from below by an endless belt adapted to be driven by a suitable motor. If the rate of delivery of fresh commodities to the upstream end of the roller conveyor exceeds the rate of removal of commodities at the downstream end, the number of commodities which are carried by the rollers increases and ultimately reaches a value at which the neighboring commodities are likely to actually contact each other. In accordance with a presently known proposal, the roller conveyor is equipped with mechanical jam-responsive switches which disconnect the motor from certain rollers when a portion of the path for the commodities is crowded to a predetermined extent. The switches cause disengagement of the endless belt from the rollers beneath the crowded portion or portions of the path by causing the corresponding portion or portions of the belt to descend and to thus interrupt the torque transmitting connection between the motor and the adjacent rollers. At the same time, one or more brakes are set in operation to immediately prevent further rotation of the rollers which are no longer frictionally engaged by the belt.

A drawback of the just described conventional roller conveyor is that the mechanism for moving selected portions of the belt into and from engagement with the adjacent rollers constitutes a complex, bulky and expensive part of the conveyor. As a rule, such mechanism includes pneumatically or electrically operated parts. The provision of brakes for the rollers which are no longer driven by the belt also contributes to complexity and cost of the roller conveyor. Moreover, the brakes and the mechanism for lifting and lowering selected portions of the belt are not readily accessible so that each inspection, maintenance or repair work involves long stoppages of the entire roller conveyor and of the production line in which the conveyor is put to use.

OBJECTS OF THE INVENTION

An object of the invention is to provide a novel and improved roller conveyor which is simpler and less expensive than, but at least as versatile as, heretofore known conveyors.

Another object of the invention is to provide a roller conveyor wherein the accumulation of excessive quantities of discrete commodities is prevented in a novel and improved way.

A further object of the invention is to provide a roller conveyor which comprises a minimal number of different parts.

An additional object of the invention is to provide novel and improved monitoring means for use in the above outlined roller conveyor.

Still another object of the invention is to provide a conveyor wherein numerous component parts are readily interchangeable.

A further object of the invention is to provide a novel and improved method of preventing overcrowding of the path for discrete commodities which is defined by a roller conveyor.

An additional object of the invention is to provide a conveyor which can be shortened or lengthened with little loss in time.

An additional object of the invention is to provide the above outlined roller conveyor with novel and improved means for holding the rollers and the means for driving the rollers.

Still another object of the invention is to provide a production line which employs one or more roller conveyors of the above outlined character.

Another object of the invention is to provide a roller conveyor which need not be provided with one or more brakes for its rollers.

A further object of the invention is to provide a conveyor which can automatically interrupt the transport of commodities when the path for such commodities begins to become crowded, and which can automatically restart the transport of discrete commodities when the restarted commodities are not likely to abut and/or otherwise adversely affect each other.

An additional object of the invention is to provide a roller conveyor wherein the parts which require frequent inspection, maintenance and/or repair are readily accessible to authorized persons.

SUMMARY OF THE INVENTION

The invention is embodied in a roller conveyor for advancement of discrete commodities in a predetermined direction along a predetermined path, for example, along a substantially horizontal path. The improved conveyor comprises a plurality of successive conveying units including a first unit adjacent a first portion of the path and a second unit adjacent a second portion of the path downstream of the first portion. Each unit comprises a set of idler rollers which are adjacent and are located beneath the respective portion of the path and extend transversely of the predetermined direction, at least one endless flexible element (e.g., a belt or band) which is disposed beneath and frictionally engages the rollers of the respective set, and a discrete prime mover for the at least one flexible element. The conveyor further comprises control means for starting and arresting the prime movers independently of each other.

Each prime mover can include an electric motor, and the starting and arresting means can include an electric circuit with electronic components for each electric motor.

Each unit of the roller conveyor preferably further comprises means for maintaining each flexible element in uninterrupted frictional torque transmitting engagement with the rollers of the respective set.

In accordance with a presently preferred embodiment, the starting and arresting means includes photoelectronic means for monitoring the commodities in the various portions of the predetermined path. The monitoring means can include at least one photoelectronic detector at the downstream end of each unit (as seen in the direction of transport of commodities along the predetermined path). The conveyor can further comprise means for receiving commodities from the last unit (again, as seen in the predetermined direction), and the detector at the downstream end of the last unit can be provided with means (e.g., one or more conductors) for transmitting signals to the receiving means. The detectors include means for generating signals which denote the degree of occupancy of the respective conveying units, and the monitoring means preferably further comprises means for delaying the transmission of signals from the signal generating means.

Each of the conveying units preferably further comprises a carrier beneath the respective set of rollers, and each flexible element then includes an elongated stretch or reach between the respective carrier and the respective set of rollers. Each such unit preferably further comprises means for maintaining the elongated stretches of the flexible elements in continuous contact with the rollers of the respective set. For example, each carrier can consist of elongated profiled metallic or plastic stock, and the maintaining means can include plastic pads between the carriers and the upper reaches of the respective flexible elements.

The conveyor further comprises first and second holders for the respective (first and second) ends of the rollers. The arrangement may be such that the first holder is common to the first ends of at least two sets of rollers and the second holder is common to the second ends of at least two sets of rollers. This contributes to convenient interchangeability of rollers.

Each unit can further comprise a driving pulley on the respective carrier at the upstream end of the respective unit, and a driven pulley on the respective carrier at the downstream end of the respective unit. The flexible elements are trained over the corresponding pairs of pulleys, and the prime movers can each comprise a gear motor and a transmission connecting the output element of the gear motor with the respective driving pulley. Each such unit can further comprise means for biasing the respective driven pulley away from the associated driving pulley (and/or vice versa) in order to tension the corresponding flexible element. Each such unit can further comprise a forked (e.g., bifurcated) support for the respective driven pulley. Each such support can be provided with a shank or stub extending into and being reciprocable in a socket of the respective carrier, and the biasing means can comprise springs which are provided in the sockets and bear against the respective shanks. Each socket can constitute a blind bore, and each spring can include at least one compression coil spring.

The control means can comprise a discrete control circuit for each conveying unit, and such control means can further comprise conductors or other suitable means for transmitting signals between the circuits.

Each unit can include a set of at least three (e.g., fifteen) parallel rollers. At least the first and second conveying units are preferably interchangeable. Such modular design contributes to simplicity of the conveyor.

The downstream end of each unit is or can be immediately adjacent the upstream end of the next-following unit.

The novel features which are considered as characteristic of the invention are set forth in particular in the appended claims. The improved roller conveyor itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
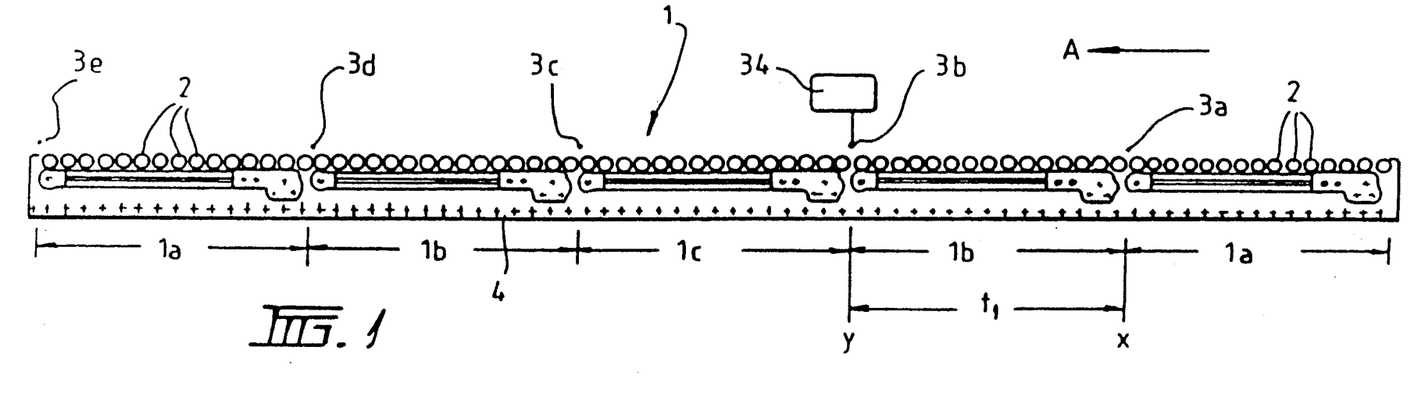
FIG. 1 is a schematic elevational view of a roller conveyor with five discrete conveying units, and further showing a device which receives commodities from the last unit of the roller conveyor.
Figure 2:
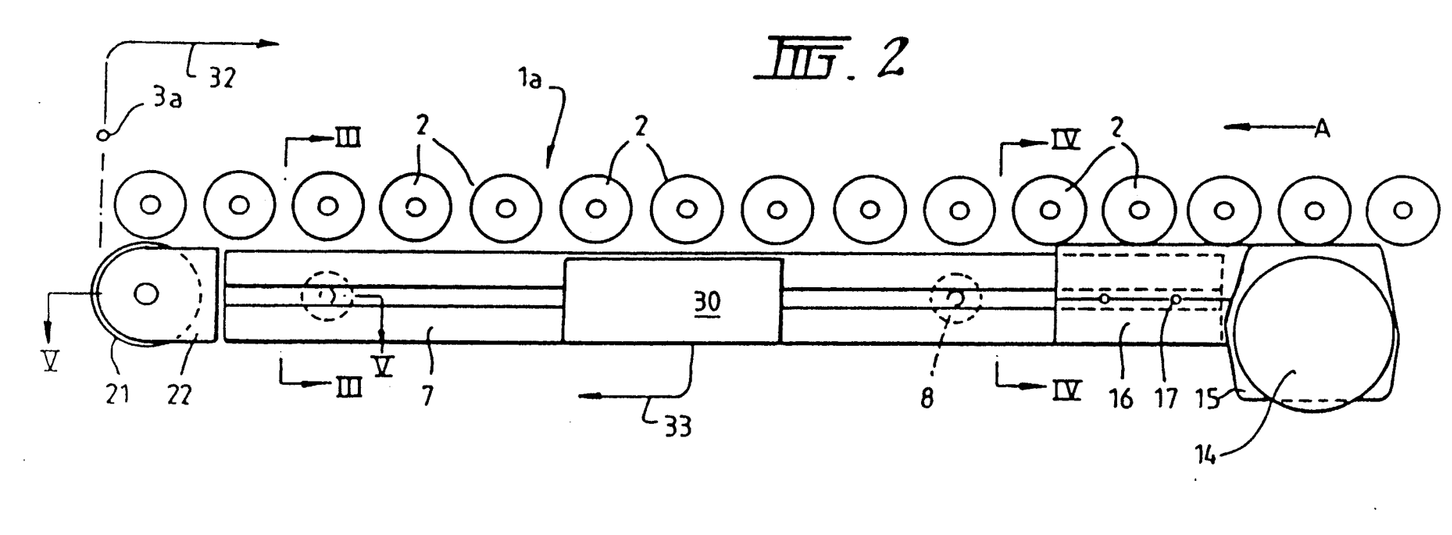
FIG. 2 is an enlarged elevational view of one of the five units in the roller conveyor of FIG. 1.

FIG. 1 shows a modular roller conveyor 1 which comprises five identical conveying units or modules 1a, 1b, 1c, 1d and 1e. Each unit comprises a certain number of parallel cylindrical idler rollers 2. FIG. 2 shows that a conveying unit (such as 1a) can comprise a total of fifteen identical idler rollers 2 which are equidistant to each other and extend transversely of the direction (arrow A) of advancement of discrete commodities (not shown) along an elongated horizontal path jointly defined by the rollers 2 of all five units 1a to 1e. The unit 1a is the first unit, and the unit 1e is the last unit of the conveyor 1 (as seen in the direction of arrow A). The downstream end of each preceding or upstream unit (1a, 1b, 1c, 1d) is or can be immediately adjacent the upstream end of the immediately following unit (1b, 1c, 1d, 1e).

The two ends of each roller 2 are rotatably mounted in two elongated spaced apart holders 4 (one shown drawn to a larger scale in each of FIGS. 3 and 4) which flank the path for the commodities and are preferably designed in such a way that each roller 2 can be rapidly withdrawn from and reinserted into the holders. For example, the upper side of each holder 4 can be provided with equidistant recesses for sitable bearings at the respective ends of the rollers 2. This renders it possible to simply drop a roller 2 into the aligned recesses of the two holders 4 and to rapidly extract a roller, e.g., to replace it with another roller or for the purposes of inspection, lubrication of the bearings and/or for other purposes. If desired, the conveyor 1 can be further provided with means (not shown) for releasably locking the ends of the rollers 2 in the selected recesses of the two holders 4, i.e., to prevent accidental lifting of one or more rollers into the path for discrete commodities.

Figure 3:
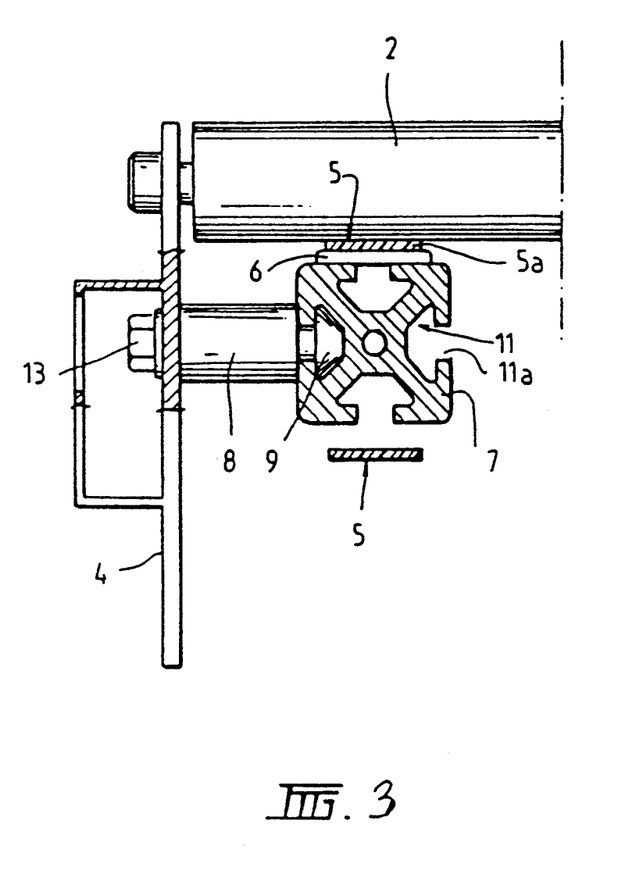
FIG. 3 is an enlarged fragmentary transverse vertical sectional view as seen in the direction of arrows from the line III—III in FIG. 2.
Figure 4:
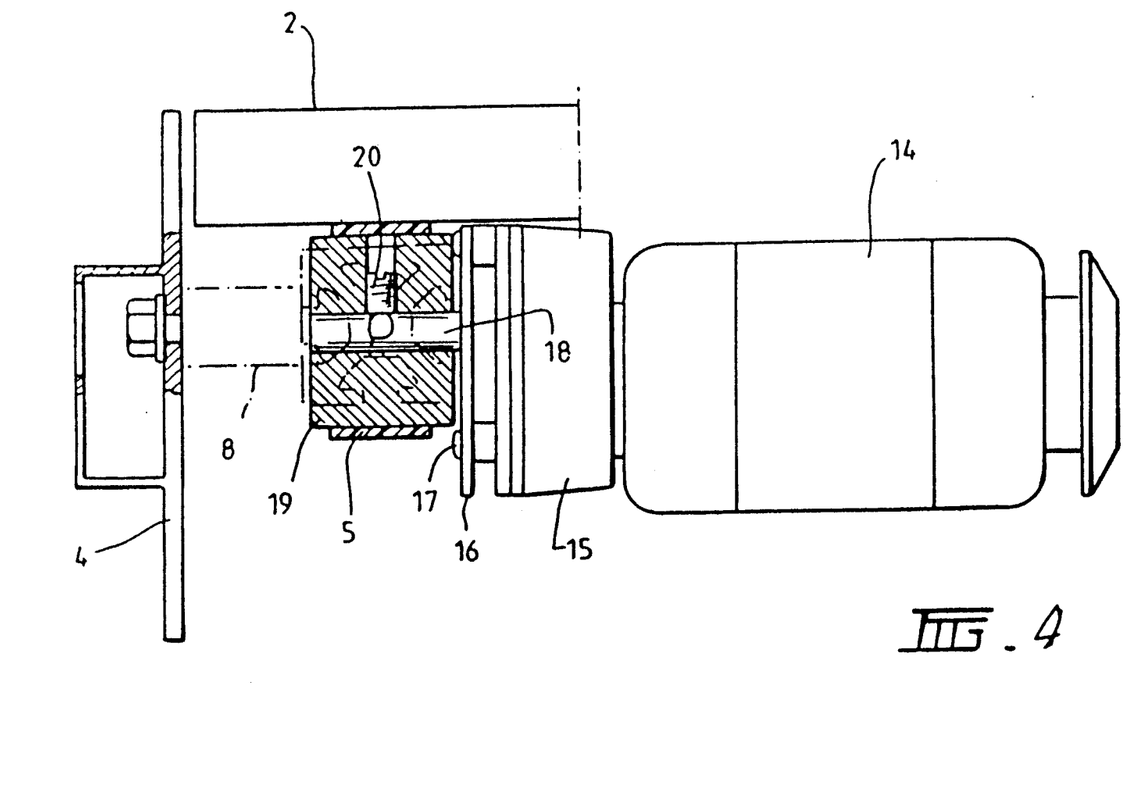
FIG. 4 is an enlarged fragmentary transverse vertical sectional view as seen in the direction of arrows from the line IV—IV in FIG. 2.

The means for rotating the rollers 2 in directions (counterclockwise, as viewed in FIGS. 1 and 2) to advance discrete commodities in the direction of arrow A) comprises a discrete endless flexible element 5 (e.g., a standard endless belt) for each of the five conveying units 1a to 1e, a discrete elongated profiled metallic carrier 7 for each unit, a plastic pad 6 which overlies the respective carrier 7 and causes the upper reach 5a of the respective belt 5 (see particularly FIG. 3) to continuously bear against the set of rollers 2 in the respective unit, and a prime mover 14, 15 for each belt 7. Each belt 5 is trained over a driving pulley 19 (FIG. 4) at the upstream end and a driven pulley 21 (FIGS. 2 and 5) at the downstream end of the respective carrier 7. Each carrier 7 is secured to at least one of the holders 4, which, in turn, are affixed to or form part of the main frame of the roller conveyor 1 or of a production line in which the conveyor 1 is put to use. FIG. 3 shows that the means for securing a carrier 7 to one of the holders 4 can comprise a distancing sleeve 8, a bolt or screw 13 having a shank extending through the distancing sleeve 8, and a nut 9 which is received in one of four longitudinally extending passages or channels 11 of the carrier 7. The channels 11 include slot-shaped portions 11a in the respective outer sides of the carrier 7 so that the shank of a screw or bolt 13 can be caused to enter a selected channel 11 at any point between the upstream and downstream ends of the carrier.

Each prime mover comprises an electric motor 14 (e.g., a gear motor) and a suitable transmission 15 (e.g., a step-down transmission) which is carried by a flange 16 on the respective carrier 7 (FIGS. 2 and 4), and transmits torque from the output element of the motor to the shaft 18 of the respective driving pulley 19. The transmission 15 is secured to the flange 16 by one or more screws 17 or other suitable fasteners. The hollow cylindrical portion of the driving pulley 19 is affixed to the shaft 18 by one or more radially extending screws 20.

Figure 5:
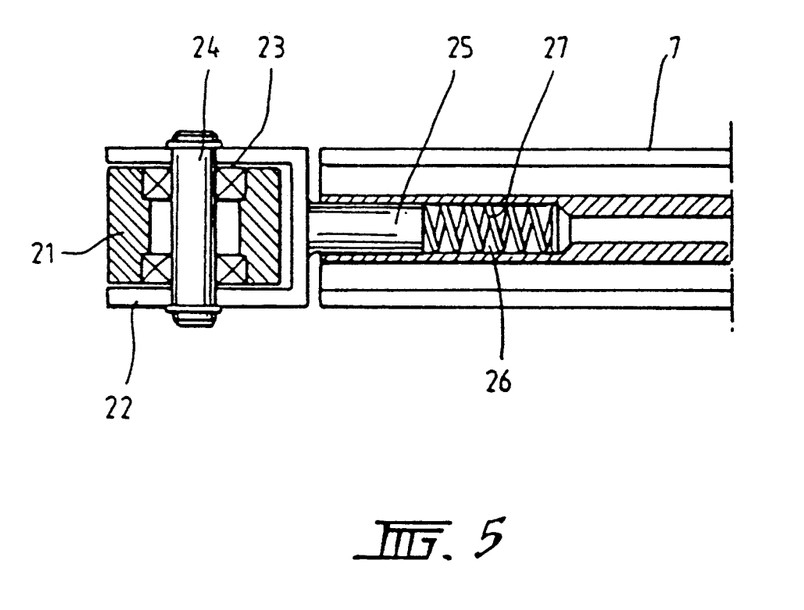
FIG. 5 is an enlarged fragmentary horizontal sectional view substantially as seen in the direction of arrows from the line V—V in FIG. 2.

FIG. 5 shows that each driven pulley 21 has a shaft 24 which is mounted in the prongs of a forked support 22 having a shank or stub 25 extending into a socket 26 (such as a blind bore or hole) in the end face of the respective carrier 7. The hollow cylindrical body of the driven pulley 21 is mounted on antifriction bearings 23 which surround the shaft 24. A compression coil spring 27 in the socket 26 of the carrier 7 serves as a means for biasing the driven pulley 21 away from the respective driving pulley 19 in order to maintain the corresponding belt 5 under requisite tension and hence in desired engagement with the respective pad 6.

The control system of the improved roller conveyor 1 comprises a discrete circuit (one denoted by a box 30 shown in FIG. 2) for each conveying unit, a photoelectronic detector (3a, 3b, 3c, 3d, 3e) at the downstream end of each conveying unit, means 32 for transmitting signals from the detectors 3a-3e to the respective circuits 30, and means 33 for transmitting signals between various circuits 30.

Each of the detectors 3a to 3e can comprise a standard radiation source and a photoelectronic transducer which generates a signal whenever the beam of light or another radiation from the respective source is interrupted or is free to impinge upon the transducer. The control system can be operated in such a way that the motor 14 of a particular conveying unit is arrested as soon as the corresponding detector 3a or 3b or 3c or 3d or 3e transmits a signal denoting that the beam from the respective radiation source is intercepted by one or more commodities for a certain interval of time and/or when such beam is interrupted while the motor 14 of the immediately following (downstream) conveying unit is arrested. For example, the detector 3a will arrest the motor 14 of the first unit 1a when the transducer of the detector 1a is not exposed to radiation for a selected interval of time or when such transducer is not exposed to radiation while the motor 14 of the unit 1b is idle. The motor 14 of the unit 1a is restarted as soon as the transducer of the detector 1a is again exposed to radiation and/or when the transducer of the detector 1b is again exposed to radiation, i.e., when the motor of the unit 1b is restarted.

The control system of the conveyor 1 can further comprise one or more suitable preferably adjustable time delay units (one shown at 34) which start the motor 14 of an upstream unit (e.g., 1a) when the control means for the downstream unit (e.g., 1b) changes from a "motor idle" signal to a "motor running" signal. The time delay is shortened accordingly when the detector of the neighboring conveying unit again generates a signal denoting that the respective transducer is again exposed to radiation issuing from the respective source. The time delay which is caused by exposure of the transducer in the neighboring photoelectronic detector to radiation can be said to constitute a priority control.

Referring again to FIG. 1, the character $t_1$ denotes the distance between the points x and y of the path for discrete commodities. For example, the belt 5 of the unit 1a will be driven by the respective motor 14 when the belt 5 of the unit 1b is idle because the detector 3b indicates that the path for radiation from the respective source to the associated transducer is interrupted. The belt 5 of the unit 1b remains idle also if the transducer of the detector 3b is not exposed to radiation for an interval of time longer than that necessary to advance a commodity through the distance $t_1$ from x to y. This applies for advancement of commodities in the direction of arrow A.

Figures 6, 7:
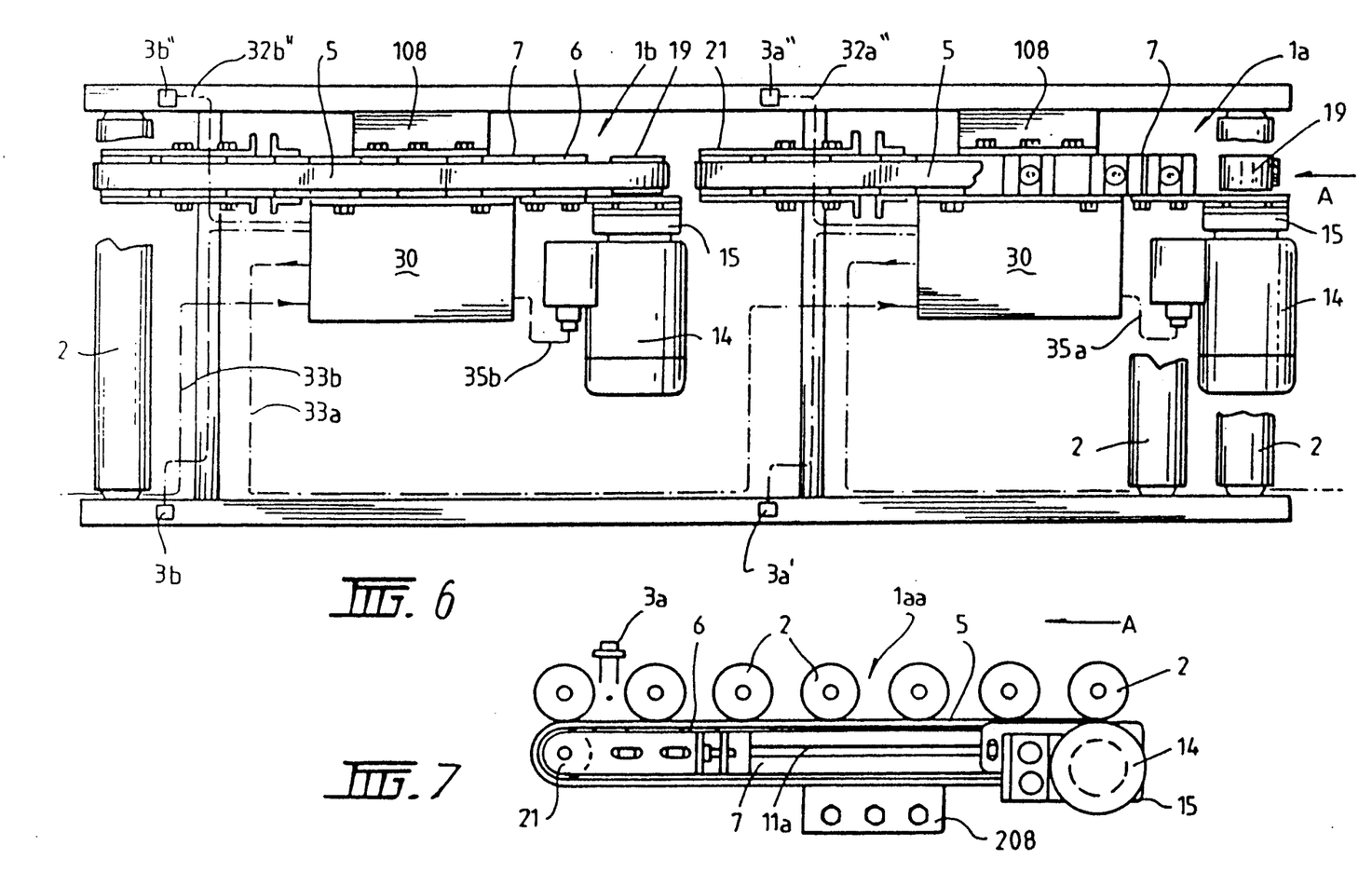
FIG. 6 is an enlarged plan view of the two first conveying units, with certain parts omitted or broken away.
FIG. 7 is a side elevational view of a conveying unit which constitutes a shortened version of the conveying unit of FIG. 2.

FIG. 6 shows in greater detail certain constituents of the first and second conveying units or modules 1a and 1b. The first detector 3a comprises a radiation source or sender 3a' and a transducer or receiver 3a". The corresponding parts of the detector 3b are shown at 3b' and 3b", respectively. The conductor between the circuits 30 of the units 1a, 1b is shown at 33a, and the conductor between the circuit 30 of the unit 1b and the circuit 30 (not shown) of the unit 1c is indicated at 33b. The characters 32a', 32a" denote the connections between the circuit 30 of the unit 1a and the elements 3a', 3a" of the detector 3a, and the characters 32b', 32b" denote the connections between the elements 3b', 3b" and the circuit 30 of the unit 1b. FIG. 6 further shows a signal transmitting connection 35a from the circuit 30 of the unit 1a to the respective motor 14, and the signal transmitting connection 35b between the circuit 30 of the unit 1b and the respective motor 14. Still further, FIG. 6 shows that the carriers 7 of the units 1a, 1b can be connected to the adjacent holders 4 by brackets 108.

FIG. 7 shows a unit or module 1aa which has only seven rollers 2. In all or nearly all other respects, the unit 1aa is or can be identical with the unit 1a or 1b or 1c or 1d or 1e. The reference character 208 denotes a modified bracket which can be used to connect the carrier 7 of the unit 1aa to one of the holders 4 (not shown in FIG. 7).

An important advantage of the improved roller conveyor is that it can dispense with levers, springs, pneumatic belt lifting or lowering means and many other parts of heretofore known roller conveyors which are designed to prevent direct contact between neighboring commodities when the rate of delivery of commodities to the upstream end of the path exceeds the rate of advancement of commodities beyond the downstream end of their path. This entails considerable simplification of the improved conveyor with attendant lower installation and maintenance costs and reduced space requirements.

Another advantage of the improved roller conveyor is that its length can be varied at will, i.e., the number of modules or conveying units can be increased or reduced with little loss in time and with minimal changes in the control system. Furthermore, each roller 2 can be rapidly withdrawn from or reinserted into the selected portions of the holders 4.

FIG. 1 further shows a receiving or withdrawing device 31 which is located downstream of the last conveying unit 1e to accept discrete commodities. The last detector 3e can be connected with the controls of the receiving device 31 by one or more conductors 3e'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A roller conveyor for advancement of discrete commodities in a predetermined direction along a predetermined path, comprising a plurality of successive conveying units including a first conveying unit adjacent a first portion of said path and a second conveying unit adjacent a second portion of said path downstream of said first portion, each of said units comprising a set of idler rollers adjacent and located beneath the respective portion of said path and extending transversely of said direction, at least one endless flexible element disposed beneath and frictionally engaging the rollers of the respective set, and a discrete prime mover for said at least one flexible element, each of said prime movers including an electric motor; and control means for starting and arresting said prime movers independently of each other, including an electric circuit with electronic components for each of said motors.

2. The conveyor of claim 1, wherein each of said units further comprises means for maintaining each of said flexible elements in uninterrupted frictional engagement with the rollers of the respective set.

3. The conveyor of claim 1, wherein said starting and arresting means further includes photoelectronic means for monitoring the commodities in said portions of said path.

4. The conveyor of claim 3, wherein each of said units includes an upstream end and a downstream end, said monitoring means including a photoelectronic detector at the downstream end of each of said units.

5. The conveyor of claim 4, wherein said units include a last unit, as seen in said direction, and further comprising means for receiving commodities from said last unit, the detector at the downstream end of said last unit having means for transmitting signals to said receiving means.

6. The conveyor of claim 4, wherein said detectors include means for generating signals denoting the degree of occupancy of the respective units, said monitoring means further comprising means for delaying the transmission of signals from said signal generating means.

7. The conveyor of claim 1, wherein each of said units further comprises a carrier beneath the respective set of rollers, each of said flexible elements having an elongated reach between the respective carrier and the respective set of rollers, each of said units further comprising means for maintaining said elongated reaches in continuous frictional engagement with the rollers of the respective set.

8. The conveyor of claim 1, wherein each of said rollers has a first end and a second end and further comprising first and second holders for the respective ends of said rollers, said first holder being common to the first ends of at least two sets of said rollers and said second holder being common to the second ends of at least two sets of said rollers.

9. The conveyor of claim 1, wherein said starting and arresting means includes a discrete control circuit for each of said units.

10. The conveyor of claim 9, wherein said starting and arresting means further comprises means for transmitting signals between said circuits.

11. The conveyor of claim 1, wherein said path is substantially horizontal and each of said units includes a set of at least three rollers, at least said first and second units being interchangeable.

12. The conveyor of claim 1, wherein each of said units has an upstream end and a downstream end and the downstream end of said first unit is immediately adjacent the upstream end of said second unit.

13. A roller conveyor for advancement of discrete commodities in a predetermined direction along a predetermined path, comprising a plurality of successive conveying units including a first conveying unit adjacent a first portion of said path and a second conveying unit adjacent a second portion of said path downstream of said first portion, each of said units comprising a set of idler rollers adjacent and located beneath the respective portion of said path and extending transversely of said direction, at least one endless flexible element disposed beneath and frictionally engaging the rollers of the respective set, a discrete prime mover for said at least one flexible element and a carrier beneath the respective set of rollers, each of said flexible elements having an elongated reach between the respective carrier and the respective set of rollers and each of said units further comprising means for maintaining said elongated reaches in continuous frictional engagement with the rollers of the respective set, each of said carriers consisting of elongated profiled stock and said maintaining means including pads of plastic material; and control means for starting and arresting said prime movers independently of each other.

14. The conveyor of claim 13, wherein each of said prime movers include an electric motor and said starting and arresting means includes an electric circuit with electronic components for each of said motors.

15. A roller conveyor for advancement of discrete commodities in a predetermined direction along a predetermined path, comprising a plurality of successive conveying units including a first conveying unit adjacent a first portion of said path and a second conveying unit adjacent a second portion of said path downstream of said first portion, each of said units having an upstream end and a downstream end and each of said units comprising a set of idler rollers adjacent and located beneath the respective portion of said path and extending transversely of said direction, at least one endless flexible element disposed beneath and frictionally engaging the rollers of the respective set, a discrete prime mover for said at least one flexible element an elongated carrier for the respective primer mover and for the respective flexible element, a driving pulley for the respective flexible element at the upstream end and a driven pulley at the downstream end of the respective unit, said pulleys being mounted on the respective carriers and each of said prime movers comprising a gear motor and a transmission connecting the gear motor with the respective driving pulley; and control means for starting and arresting said prime movers independently of each other.

16. The conveyor of claim 15, wherein each of said units further comprises means for biasing the respective driven pulley away from the respective driving pulley so as to tension the respective flexible element.

17. The conveyor of claim 16, wherein each of said units further comprises a forked support for the respective driven pulley, each of said supports having a shank reciprocable in a socket of the respective carrier and said biasing means comprising springs provided in said sockets and bearing against the respective shanks.

18. The conveyor of claim 17, wherein each of said sockets is a blind bore and each of said springs includes a compression spring.

* * * * *